United States Patent
Pyo et al.

(10) Patent No.: US 7,336,905 B2
(45) Date of Patent: Feb. 26, 2008

(54) BIDIRECTIONAL OPTICAL TRANSCEIVER

(75) Inventors: Sun-Hyoung Pyo, Incheon (KR);
Young-Kwon Yoon, Anyang-si (KR);
Gi-Tae Mun, Suwon-si (KR); Hyun-Ho Ryoo, Suwon-si (KR)

(73) Assignee: Samsung Electronics Co., Ltd., Maetan-Dong, Yeongtong, Gu, Suwon-Si, Gyeonggi-Do (KR)

( * ) Notice: Subject to any disclaimer, the term of this patent is extended or adjusted under 35 U.S.C. 154(b) by 242 days.

(21) Appl. No.: 10/890,474

(22) Filed: Jul. 13, 2004

(65) Prior Publication Data
US 2005/0169586 A1   Aug. 4, 2005

(30) Foreign Application Priority Data
Feb. 4, 2004   (KR) .............. 10-2004-0007371

(51) Int. Cl.
*H04B 10/00* (2006.01)
*G02B 6/36* (2006.01)

(52) U.S. Cl. .............. 398/139; 398/135; 398/138; 385/88; 385/92; 385/27; 385/39

(58) Field of Classification Search ........... 385/92–93, 385/49, 39, 47, 88; 398/138–139, 135; 257/81
See application file for complete search history.

(56) References Cited

U.S. PATENT DOCUMENTS

| | | | | |
|---|---|---|---|---|
| 5,485,538 A * | 1/1996 | Bowen et al. | ................ | 385/92 |
| 5,487,124 A * | 1/1996 | Bowen et al. | ................ | 385/93 |
| 6,075,635 A * | 6/2000 | Butrie et al. | ................ | 398/139 |
| 6,350,064 B2 * | 2/2002 | Mitsuda et al. | ................ | 385/88 |
| 6,374,021 B1 * | 4/2002 | Nakanishi et al. | ............ | 385/49 |
| 6,493,121 B1 * | 12/2002 | Althaus | ................ | 398/135 |
| 6,722,793 B2 * | 4/2004 | Althaus et al. | ................ | 385/92 |
| 6,819,840 B2 * | 11/2004 | Tohgoh et al. | ................ | 385/49 |
| 6,939,058 B2 * | 9/2005 | Gurevich et al. | ............ | 385/93 |
| 6,954,592 B2 * | 10/2005 | Tan et al. | ................ | 398/138 |
| 7,031,575 B2 * | 4/2006 | Blauvelt et al. | ............ | 385/39 |
| 7,039,278 B1 * | 5/2006 | Huang et al. | ................ | 385/47 |
| 2004/0069997 A1 * | 4/2004 | Dair et al. | ................ | 257/81 |

FOREIGN PATENT DOCUMENTS

| | | |
|---|---|---|
| CN | 2544473 | 4/2003 |
| EP | 1154299 | 11/2001 |
| JP | 08-160259 | 6/1996 |
| JP | 09-090177 | 4/1997 |
| JP | 09-304666 | 11/1997 |
| JP | 2003-195119 | 7/2003 |
| JP | 2003-215404 | 7/2003 |

* cited by examiner

*Primary Examiner*—Brian Healy
*Assistant Examiner*—Guy G Anderson
(74) *Attorney, Agent, or Firm*—Cha & Reiter, LLC

(57) ABSTRACT

A bidirectional optical transceiver is disclosed. The transceiver comprises an optical fiber which is adapted to input/output optical signals and has a slant surface polished with an angle, a substrate having a groove formed on its upper portion to position the optical fiber therein, a wavelength distributor filter inserted into the substrate with a slant substantially matching the angle in the optical fiber, a photodiode positioned on the substrate to receive optical signals, a TO-Can having a laser diode that is positioned in a location opposite to the optical fiber to transmit optical signals, and a single housing adapted to mount the optical fiber, the substrate, and the TO-Can thereon.

20 Claims, 7 Drawing Sheets

BIDIRECTIONAL OPTICAL TRANSCEIVER

CLAIM OF PRIORITY

This application claims priority, pursuant to 35 USC §119, to that patent application entitled "Bidirectional Optical Transceiver," filed with the Korean Intellectual Property Office on Feb. 4, 2004 and assigned Ser. No. 2004-7371, the contents of which are hereby incorporated by reference.

BACKGROUND OF THE INVENTION

1. Field of the Invention

The present invention relates to an optical communications, and more particularly, to a low cost bidirectional optical transceiver having minimal component alignment criteria.

2. Description of the Related Art

Generally, in optical communication utilizing optical fibers a bidirectional optical transceiver transmits a plurality of channels simultaneously using different wavelengths of light. In the case of a single-mode optical fiber, the communications typically occur at two optical wavelengths (e.g., 1.3 nm and 1.55 nm), because these wavelengths exhibit less attenuation. An FTTH (fiber-to-the-home) system is a WDM (wavelength division multiplex) system that makes it possible to integrate a communication channel and a CATV channel onto a line of optical fiber. Thus, rather than using separate lines of optical fiber for transmission and reception, a single line of optical fiber is used to perform transmission and reception at the same time. This saves the cost for installing optical fibers, decreases the number of optical components, and implements a more economical optical communication system.

Conventional bidirectional optical transceivers are classified into those using a PLC (planar lightwave circuit) substrate and those using a TO-Can substrate. FIG. 1 shows a cross-sectional view of a conventional bidirectional optical transceiver having two TO-Cans. The bidirectional optical transceiver 1 is composed of a wavelength distributor 6 adapted to distribute optical signals inputted from external sources, as well as optical signals inputted/outputted to/from a laser diode (LD) 3 and a photodetector (PD) 4 and a transceiver module made of a group of optical fibers 5, which are light-receiving devices adapted to identify respective wavelengths distributed from the wavelength distributor 6.

The wavelength distributor 6 is composed of a wavelength distributor 6 adapted to distribute the optical signals provided by LD 3, as well as those from external sources, and a Y-distributor (not shown) acting as a transmission/reception line for the optical signals. The wavelength distributor 6 is interposed in between the transceiver module and the Y-distributor. The wavelength distributor 6, may include a wavelength division multiplex filter, that performs multiple division of inputted optical signals according to their wavelength bands. In this case, a multiplexer filter, or a Bragg diffraction grating may be used.

The Y-distributor is an optical waveguide having a common waveguide acting as a line both for optical signals inputted from external sources and for those provided by LD 3. The transceiver module is adapted to modulate inputted signals into optical signals and an optical detector (not shown) that is adapted to detect optical signals inputted via an optical fiber, which monitors the optical intensity of the LD 3.

The bidirectional optical transceiver 1 has a light-transmitting portion and a light-receiving portion, each of which is made of a TO-Can 2, that are actively aligned, and coupled to each other. Since the TO-Can 2 itself is fabricated using common technology, the bidirectional optical transceiver has little manufacturing cost and, thus, a high yield.

However, conventional bidirectional optical transceivers become bulky. For example, in the case of a triplexer, three TO-Cans are used and coupled together. Compared with a diplexer, which uses two TO-Cans, the triplexer needs additional time and effort to actively align the additional TO-Can. Further as there are an increased number of components, the chance of a defect occurring increases and, hence, the manufacturing yield is decreased.

FIG. 2 shows a conventional bidirectional optical transceiver 10 using a PLC substrate 20. The bidirectional optical transceiver 10 comprises a connector 30 formed on a PLC substrate 20, a PD 40, an LD 50, and an optical signal monitor (not shown) adapted to monitor the intensity of light outputted from the LD 50. A waveguide 60 is formed on the PLC substrate 20 in a Y-branch structure that is bifurcated into the PD 40 and the LD 50, respectively. The PD 40 detects optical signals inputted via the waveguide 60. The LD 50 generates a predetermined wavelength of light, which is outputted external to the device through the waveguide 60. Each of the bifurcated parts of the waveguide 60, which has a Y-branch structure, is located opposite to each of the PD 40 and the LD 50, respectively.

The bidirectional optical transceiver 10 has an L-shaped housing 70, in which the PLC substrate 20 is seated. An optical fiber 80 is positioned on a side of the housing 70 and a connector 30 is positioned in a location opposite to the optical fiber 80. The bidirectional optical transceiver 10 may be configured as a bidirectional optical transceiver module, wherein the optical fiber 80 is mounted on the PLC substrate 20 and is manually aligned with an end of the waveguide 60.

Such a bidirectional optical transceiver, which has manual alignment structure, is difficult to fabricate, because the photodetector, the laser diode and the optical signal monitor must be precisely aligned, typically within an error range of 1-2 μm, and fastened on the single PLC substrate. In addition to such a high precision requirement, the optical devices should be fabricated to fulfill specific requirements. For example, the laser diode must be fabricated so that the light exits with a very small exit angle; otherwise, high insertion loss occurs. Further, when the laser diode is a Distributed Feedback Laser (DFB), there is no place left to include an optical isolator. Furthermore, the photodetector needs to be tailored to the optical waveguides. In summary, the cost of the conventional process to fabricate the optical transceiver is further increased due to the requirements for special laser diode and photodetector, and the yield is poor.

Hence, there is a need in the industry for a bidirectional optical transceiver that is compact in size and has a simple manufacturing process.

SUMMARY OF THE INVENTION

Accordingly, the present invention has been made to solve the above-mentioned problems occurring in the prior art and provides additional advantages, by providing a bidirectional optical transceiver that can be made in a compact size with a simple manufacturing process.

One aspect of the present invention is to provide a bidirectional optical transceiver having a single housing, which includes active photonic devices (e.g., an LD, a PD) and passive photonic devices (e.g., a waveguide, an optical fiber), as well as improved light source structure and optical axis alignment structure, so that it has low insertion loss and can be manufactured easily.

Another aspect of the present invention is to provide a bidirectional optical transceiver having a single housing, which includes active photonic devices (e.g., an LD, a PD) and passive photonic devices (e.g., a waveguide, an optical fiber), so that it has fewer components and has reduced manufacturing cost.

In one embodiment, a bidirectional optical transceiver comprises an optical fiber which is adapted to input/output optical signals and has a slant surface polished with an angle, a substrate having a groove, preferably a V-groove, formed on its upper portion to position the optical fiber therein, a wavelength distributor filter inserted into the substrate at a slant, a photodiode positioned on the substrate to receive optical signals from the wavelength distributor filter, a TO-Can having a laser diode which is positioned in a location opposite to the optical fiber to transmit optical signals, and a single housing adapted to mount the optical fiber, the substrate, and the TO-Can thereon.

BRIEF DESCRIPTION OF THE DRAWINGS

The above features and advantages of the present invention will be more apparent from the following detailed description taken in conjunction with the accompanying drawings, in which.

DETAILED DESCRIPTION

Hereinafter, embodiment of the present invention will be described with reference to the accompanying drawings. For the purposes of clarity and simplicity, a detailed description of known functions and configurations incorporated herein will be omitted as it may make the subject matter of the present invention unclear.

Figure 1:
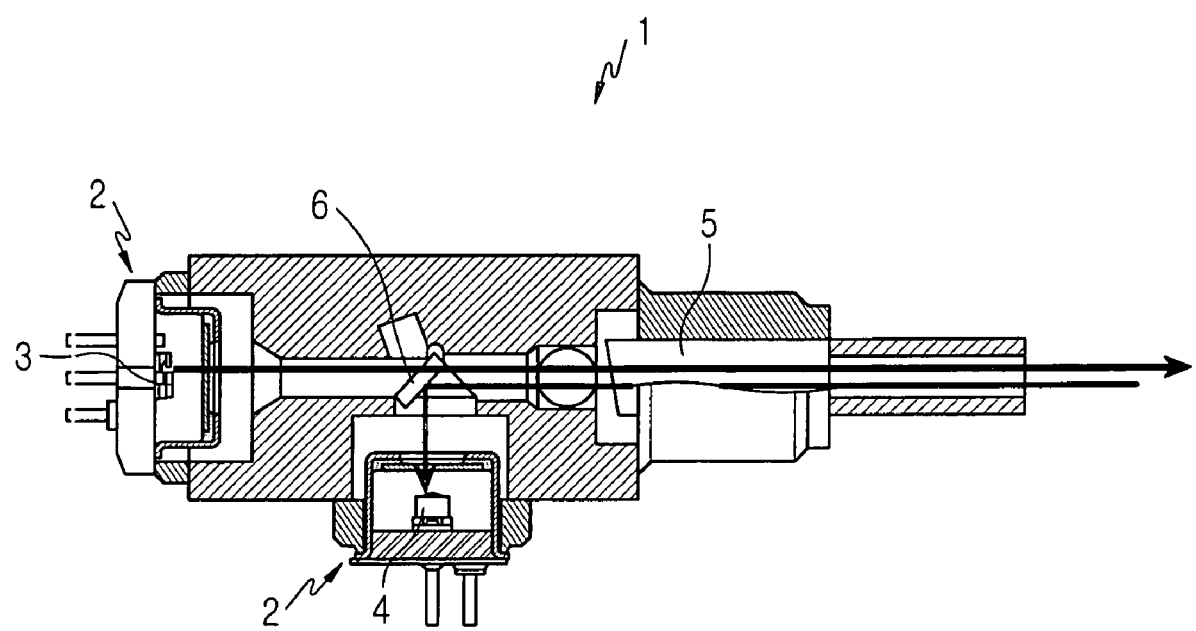
FIG. 1 is a cross-sectional view of a conventional bidirectional optical transceiver having a TO-Can.
Figure 2:
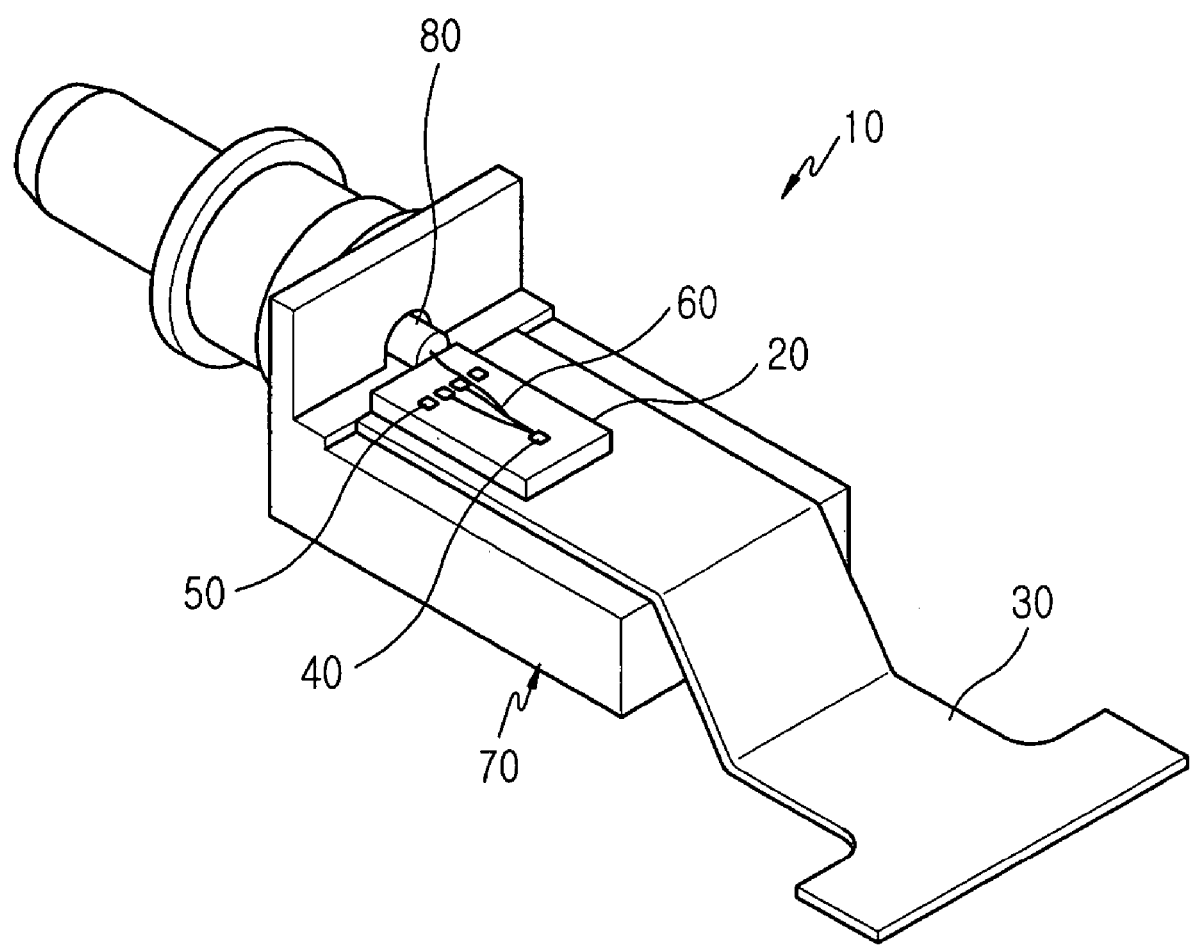
FIG. 2 is perspective view showing a conventional bidirectional optical transceiver having a PLC substrate.
Figure 3:
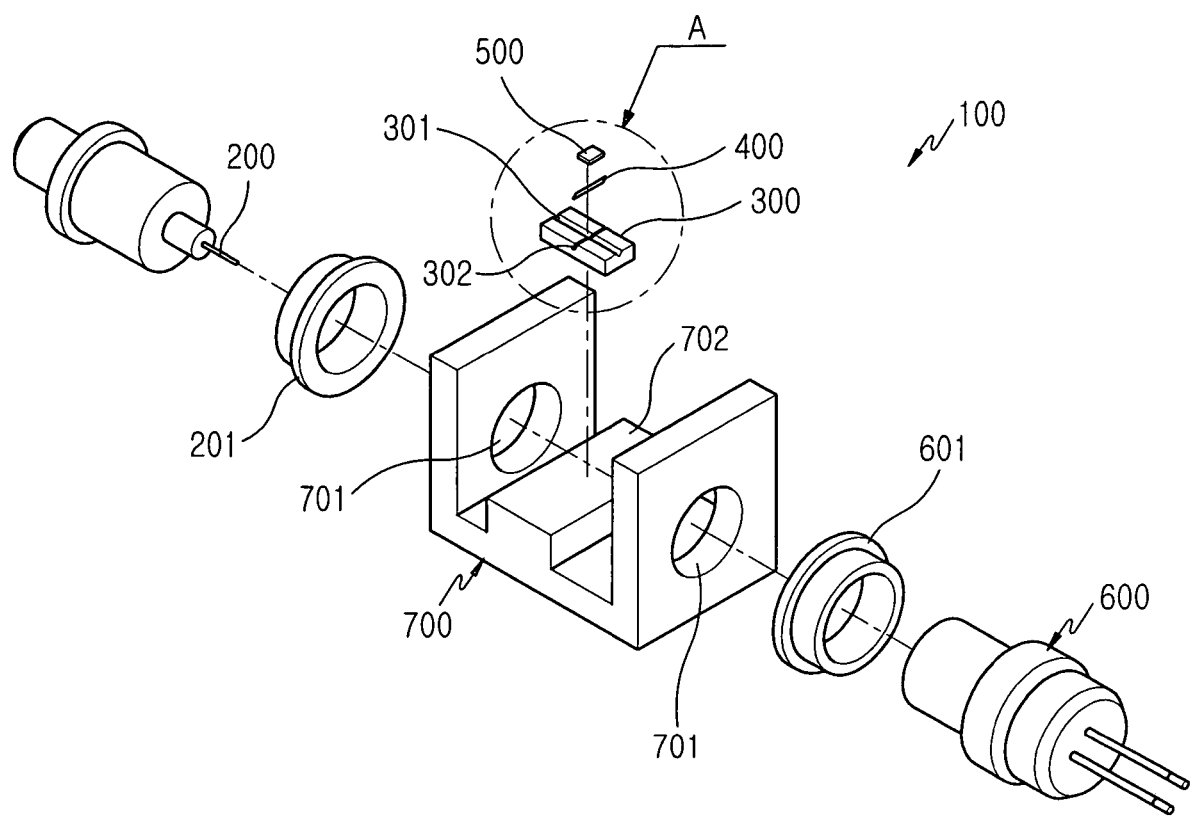
FIG. 3 is an exploded perspective view showing the construction of a bidirectional optical transceiver according to the present invention.

FIGS. 3-7 illustrate a bidirectional optical transceiver 100 in accordance with the principles of the invention. FIG. 3 illustrates an overview of one embodiment of bidirectional optical transceiver 100, whereas FIGS. 4-7 illustrate more detailed aspects of bidirectional optical transceiver 100.

Referring to FIG. 3, bidirectional optical transceiver 100 comprises an optical fiber 200, substrate 300, wavelength distributor filter 400, PD 500, TO-Can 600, and single housing 700. The optical fiber 200 operates to input/output optical signals 800, 900 (see FIG. 7) to/from bidirectional optical transceiver 100. Fiber 200 further includes a slant surface polished with a slant, or an angle. The substrate 300 is provided with the wavelength distributor filter 400 and the PD 500. The substrate 300 has a groove 301 formed on its upper portion so that the optical fiber 200 can be positioned therein. The wavelength distributor filter 400 is inserted into the substrate 300 substantially perpendicular or orthogonal to groove 301 at substantially the same slant direction as that of the slant surface of the optical fiber 200 (see FIG. 4). Preferably, groove 301 is a V-groove. However, it would recognized that other forms of grooves or channels may be in formed and utilized without altering the scope of the invention. For purposes of explaining the invention, the following discussion is made with regard to groove 301 being a V-groove.

The PD 500 is positioned on an upper portion of the wavelength distributor filter 400 so that it can receive the optical signal 900 reflected by the wavelength distributor filter 400. The TO-Can 600 has an LD (not shown) therein for transmitting optical signal 800. The LD is positioned in a location opposite to the optical fiber 200. In one aspect of the invention, an isolator 1000 (see FIG. 6) may be interposed between the TO-Can 600 and the optical fiber 200. The single housing 700 is adapted to mount the substrate 300, which has a passive photonic device (i.e., optical fiber 200) and active photonic devices (PD 500, LD), and the TO-Can 600 thereon.

Figure 4:
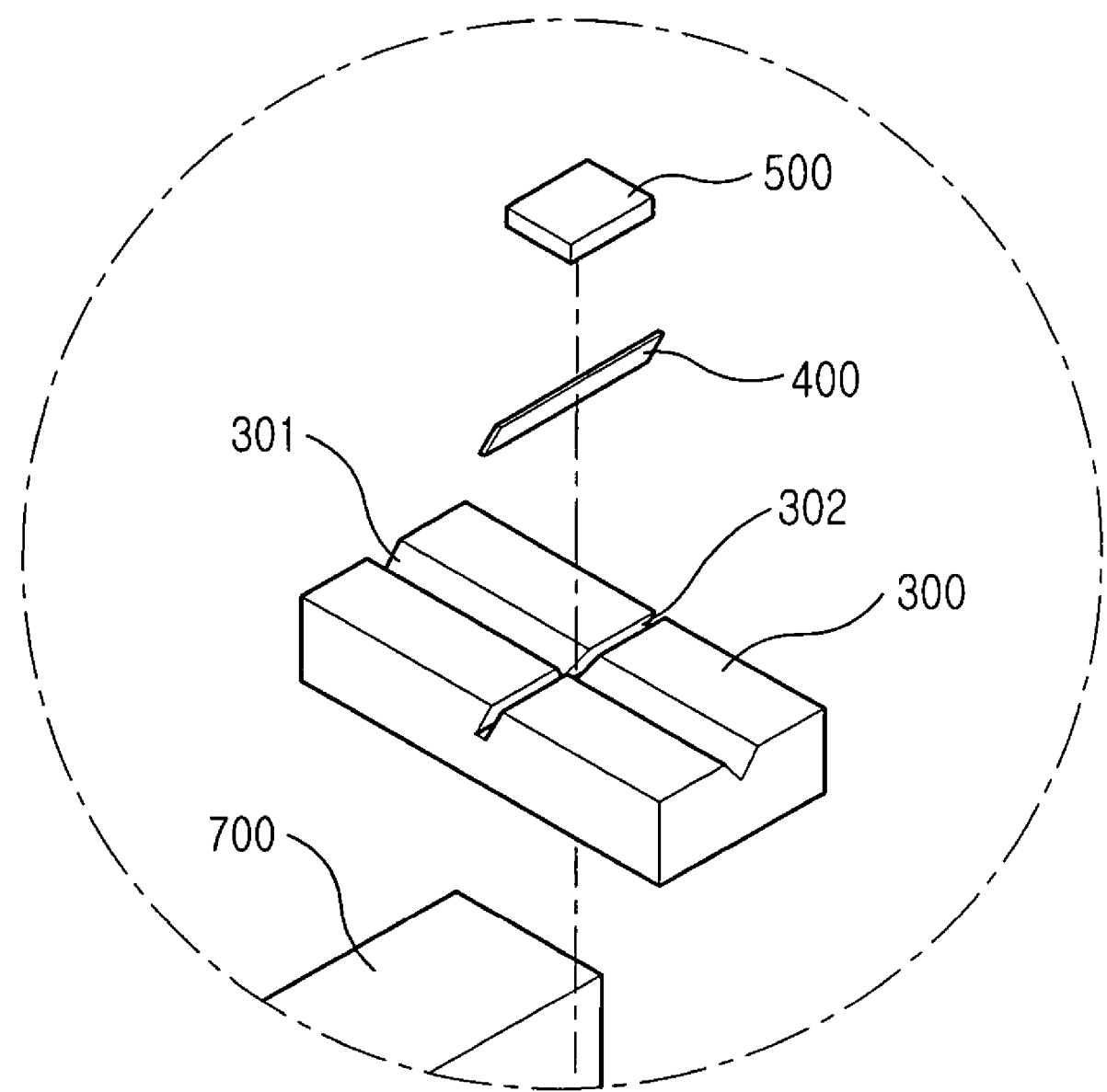
FIG. 4 is an exploded perspective view magnifying part A of FIG. 3.
Figure 5:
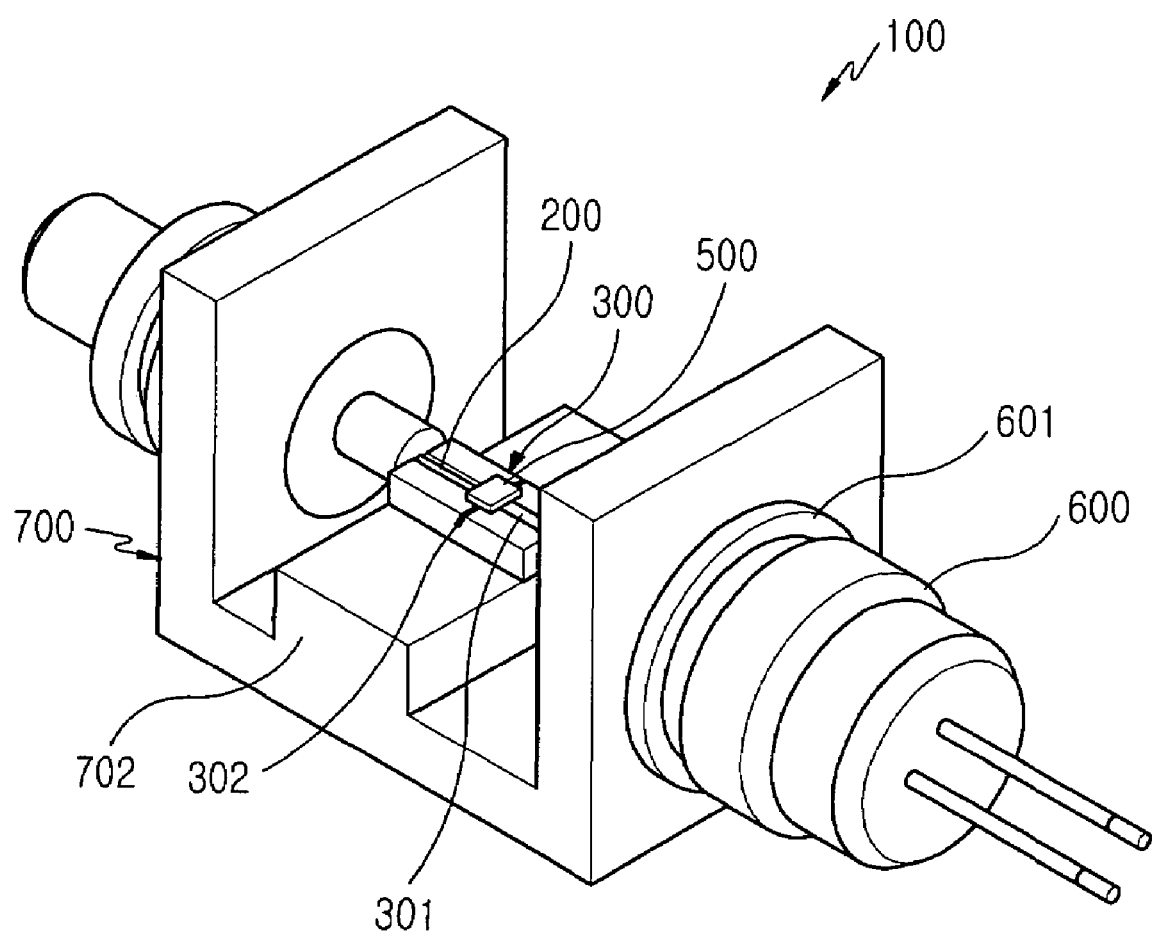
FIG. 5 is an assembled perspective view showing a bidirectional optical transceiver according to one embodiment of the present invention.

With reference to FIG. 4, the substrate 300 may be made of a SiOB (silicon optical bench) and thus referred to as a silicon substrate. Alternatively, the substrate 300 can be made of a PLC substrate. The wavelength distributor filter 400 is positioned in slot 302 within substrate 300, which is slanted in the same direction as that of the slant surface of the optical fiber 200. Slot 302, in this exemplary case, when viewed in a top view is substantially orthogonal to V-groove 301.

Returning to FIG. 3, the single housing 700 has a U-shaped configuration and is provided with a supporting holder 201 on its side for retaining the optical fiber 200 and is provided with a retaining holder 601 on its other side for retaining the TO-Can 600. The single housing 700 has a coupling hole 701 formed on both sides thereof. The coupling hole 701 extends through both the supporting holder 201 and the retaining holder 601 to couple them together. The single housing 700 is also provided with a substrate seat 702 to seat and fasten the substrate 300 thereon. The V-groove 301 is adapted to position various types of optical fiber 200 therein. In another aspect, the wavelength distributor filter 400 may be replaced with a variety of alternative materials. In still another aspect the wavelength distributor filter may include a Bragg grating.

Operations of the bidirectional optical transceiver according to an embodiment of the present invention will now be described in more detail with reference to FIGS. 3 to 7.

As shown in FIGS. 3 and 4, the bidirectional optical transceiver 100 mounts the optical fiber 200, the substrate 300, and the TO-Can 600, to the single housing 700.

In this state, the laser (not shown) positioned in the TO-Can 600, modulates optical signal 800, that passes through the wavelength distributor filter 400 inserted in the substrate 300. In one aspect, laser diode (not shown) in the TO-Can 600 is an edge-emitting source. When the LD is subject to a forward bias, spontaneous emission of photons occurs and the optical gain is increased as injected electrons are recombined.

Figure 6:
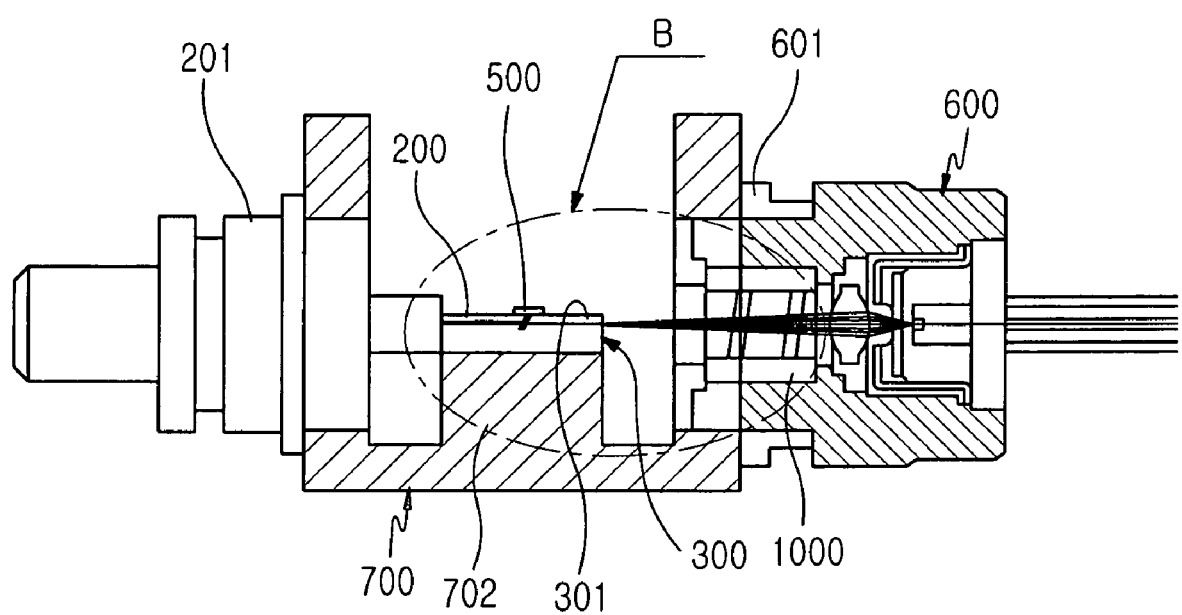
FIG. 6 is a side sectional view showing a bidirectional optical transceiver according to one embodiment of the present invention.
Figure 7:
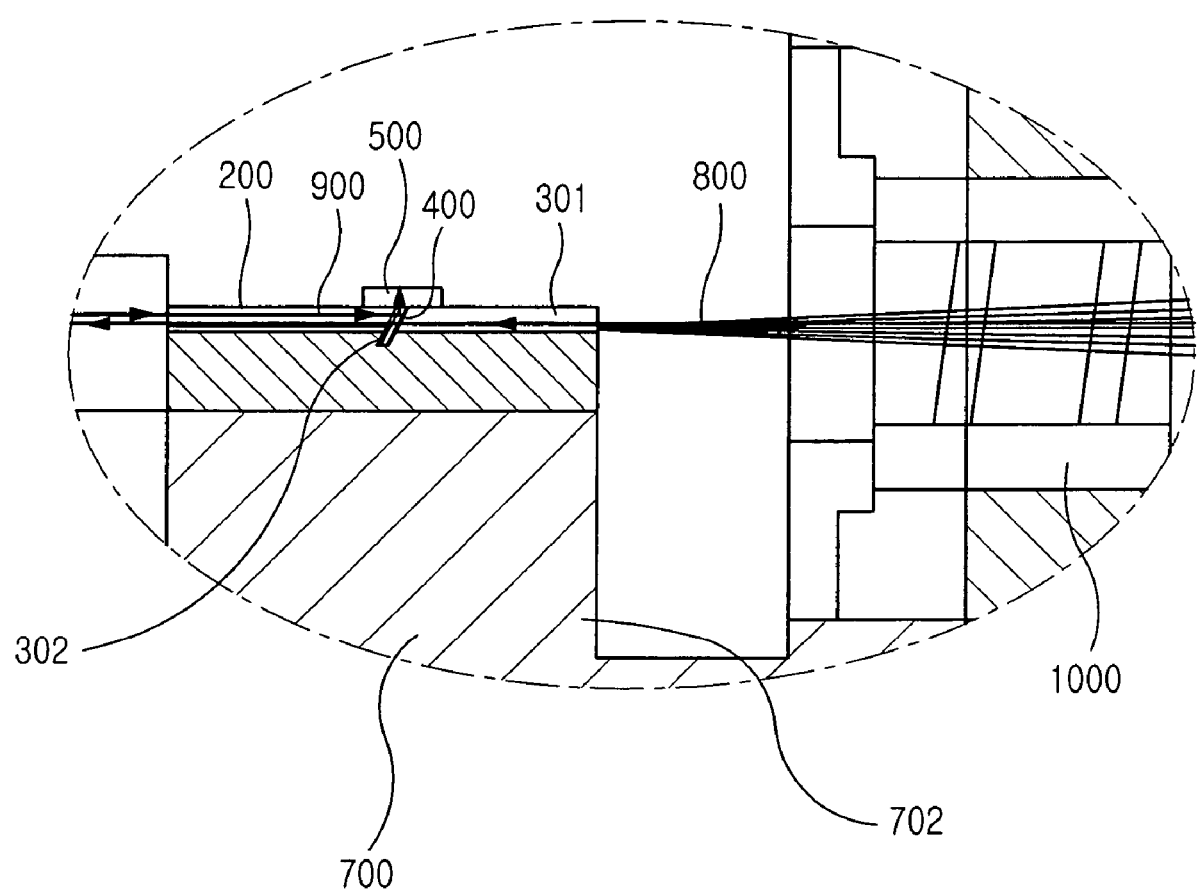
FIG. 7 is an exploded perspective view magnifying part B of FIG. 7.

Referring to FIGS. 6 and 7, the optical fiber 200 is positioned in a first longitudinal portion of the groove 301. The optical signal 800 is transmitted along a second longitudinal portion of the groove 301, and after passing through the wavelength distributor filter 400, the optical signal 800 is outputted outside housing 700 through optical fiber 200.

When the optical signal 900 is inputted, via the optical fiber 200, as shown in FIG. 7, it undergoes vertical reflection at the wavelength distributor filter 400 and is transmitted to the PD 500, which is positioned above distributor filter 400.

The PD 500 detects the inputted optical signal 900 and causes to be generated a predetermined, or known, measure of light from the laser diode, in response to the light energy reflected by wavelength distributor filter 400.

Returning to FIG. 5, the single housing 700 is provided with the optical fiber 200 on one side and is provided with the TO-Can 600, having the LD mounted thereon, in a location opposite to the optical fiber 200. Optical signal 800, (see FIG. 7), which are outputted from the laser diode is transmitted along a V-groove to the optical fiber 200, in a first direction, while the optical signal 900, which is provided from the outside, i.e., a second direction, is provided to the PD 500 via the wavelength distributor filter 400.

As shown in FIGS. 6 and 7, the optional isolator 1000, which is positioned between the TO-Can 600 and the optical fiber 200, is adapted to generate little attenuation when the optical signal 800 is transmitted in a first direction, and generate substantial attenuation in a second, opposite, direction to prevent interference with optical signal 800.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A bidirectional optical transceiver comprising:
   an optical fiber which is adapted to input/output optical signals and has a slant surface polished with an angle;
   a substrate having a groove formed on its upper surface to position the optical fiber therein in a first longitudinal portion along an optical axis;
   a TO-Can having a laser diode, the TO-Can being positioned opposite to the optical fiber to transmit optical signals through a second longitudinal portion of the groove to the optical fiber in a first direction;
   a wavelength distributor filter inserted completely into the substrate, within a slot formed on the upper surface of the substrate, and in the angle substantially matching the angle on the slant surface of the optical fiber to receive optical signals from the optical fiber in a second direction, wherein the slot is substantially orthogonal to the groove;
   a photodiode being positioned on the upper surface of the substrate and being configured to cover an opening of the slot, and being configured to receive optical signals from the second direction that are vertically reflected from the wavelength distributor filter; and
   a single housing adapted to mount the optical fiber, the substrate, and the TO-Can thereon.

2. The bidirectional optical transceiver as claimed in claim 1, wherein the substrate is made of a silicon optical bench.

3. The bidirectional optical transceiver as claimed in claim 1, wherein the substrate is made of a PLC substrate having an optical waveguide therein.

4. The bidirectional optical transceiver as claimed in claim 1, wherein the single housing has a U-shaped configuration.

5. The bidirectional optical transceiver as claimed in claim 1, wherein the optical fiber is retained on a side of the single housing by a supporting holder and the TO-Can is retained on the other side thereof by a retaining holder.

6. The bidirectional optical transceiver as claimed in claim 1, wherein the single housing has at least one coupling hole formed on both sides thereof, the coupling hole extending through both the supporting holder and the retaining holder to couple them together.

7. The bidirectional optical transceiver as claimed in claim 1, wherein the single housing is provided with a substrate seat for seating and retaining the substrate thereon.

8. The bidirectional optical transceiver as claimed in claim 1, wherein an isolator is retained between the TO-Can and the optical fiber.

9. The bidirectional optical transceiver as claimed in claim 1, wherein the wavelength distributor filter includes a Bragg grating.

10. A bidirectional optical transceiver comprising:
    a substrate having on an upper surface a groove means for providing a waveguide for aligning optical signals;
    a slot substantially orthogonal to the groove means and formed on the substrate upper surface, the slot being angularly cut into the substrate;
    a wavelength distributor filter inserted completely into the slot; and
    a photo-detector being positioned on the upper surface of the substrate and being configured to cover an opening of the slot, the photo-detector for detecting light provided by the wavelength distributor filter.

11. The transceiver as claimed in claim 10, further comprising:
    an optical fiber positioned through a first longitudinal portion of the groove means in an axial direction; and
    a laser diode positioned opposite the optical fiber with respect to the wavelength distributor filter, for generating a light transmitted through a second longitudinal portion of the groove means into the optical fiber.

12. The transceiver as claimed in claim 11, wherein an end of the optical fiber has a polished surface formed at an angle substantially parallel to the slot angle.

13. The transceiver as claimed in claim 11, further comprising:
    means for biasing the laser diode dependent on a light level detected by the photo diode.

14. The transceiver as claimed in claim 10, wherein the wavelength distributor filter includes a Bragg grating.

15. The transceiver as claimed in claim 10, wherein the substrate is selected from the group consisting of: silicon or PLC.

16. The transceiver as claimed in claim 12, wherein the angle is determined based on wavelength, fiber type, fiber composition, reflectivity, and insertion loss.

17. A bi-direction optical device comprising:
    an optical fiber including a slant surface polished with an angle at a first end;
    a substrate having a V-groove formed on its upper surface to position the optical fiber through a first longitudinal portion;
    a wavelength distributor filter inserted completely into a slot formed on the substrate substantially orthogonal to the groove at a slant substantially matching the angle on the optical fiber first end;
    a photodiode being positioned on the upper surface of the substrate and being configured to cover an opening of the slot, and being configured to receive optical signals reflected from the wavelength distributor filter;
    a laser diode which is positioned opposite to the optical fiber to transmit optical signals through a second lon gitudinal portion of said V-groove to the optical fiber; and a housing adapted to mount the optical fiber, the substrate, and the laser:

a coupling hole formed on each of a first side and an opposite second side, wherein the optical fiber is retained on the first side by a supporting holder and the laser is retained on the opposite second side by a retaining holder.

18. The device as claimed in claim 17, further comprising:
an isolator between the laser and the substrate.

19. The device as claimed in claim 17, wherein the filter includes a Bragg grating.

20. The device as claimed in claim 17, wherein the laser is mounted in a TO-Can.

* * * * *